(12) United States Patent
Liu et al.

(10) Patent No.: US 11,567,729 B2
(45) Date of Patent: Jan. 31, 2023

(54) SYSTEM AND METHOD FOR PLAYING AUDIO DATA ON MULTIPLE DEVICES

(71) Applicant: BEIJING XIAOMI PINECONE ELECTRONICS CO., LTD., Beijing (CN)

(72) Inventors: Mengmei Liu, Beijing (CN); Zerui Han, Beijing (CN); Renwei Huang, Beijing (CN); Chen Zhang, Beijing (CN); Fei Xiang, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 0 days.

(21) Appl. No.: 17/328,341

(22) Filed: May 24, 2021

(65) Prior Publication Data
US 2022/0156036 A1 May 19, 2022

(30) Foreign Application Priority Data
Nov. 19, 2020 (CN) .......................... 202011306975.9

(51) Int. Cl.
*G06F 3/16* (2006.01)
*G10L 19/008* (2013.01)
*H04S 7/00* (2006.01)

(52) U.S. Cl.
CPC ............ *G06F 3/165* (2013.01); *G10L 19/008* (2013.01); *H04S 7/303* (2013.01); *H04S 2400/01* (2013.01); *H04S 2400/11* (2013.01)

(58) Field of Classification Search
CPC ....... G06F 3/165; G10L 19/008; H04S 7/303; H04S 2400/01; H04S 2400/11
See application file for complete search history.

(56) References Cited

U.S. PATENT DOCUMENTS

| 9,942,688 | B2 | 4/2018 | Robinson et al. | |
|---|---|---|---|---|
| 10,063,967 | B2 * | 8/2018 | Noda | H04R 1/406 |
| 10,149,088 | B2 * | 12/2018 | Patil | H04S 7/301 |
| 10,932,077 | B2 * | 2/2021 | Goldberg | G06F 3/165 |
| 11,337,025 | B2 * | 5/2022 | Takase | A63F 13/54 |
| 2005/0254462 | A1 | 11/2005 | Gopal | |
| 2017/0238120 | A1 * | 8/2017 | Milne | H04R 5/02 |
| | | | | 381/17 |

(Continued)

FOREIGN PATENT DOCUMENTS

| CN | 101465910 A | 6/2009 |
|---|---|---|
| CN | 101465910 B | 10/2012 |

(Continued)

OTHER PUBLICATIONS

Chinese Patent Application No. 202011306975.9, Office Action dated Jul. 5, 2021, 7 pages.

(Continued)

*Primary Examiner* — Joseph Saunders, Jr.
*Assistant Examiner* — Joseph Saunders
(74) *Attorney, Agent, or Firm* — Lathrop GPM LLP

(57) ABSTRACT

A method for playing audio data, includes: detecting a number and position relationships of associated audio playback devices; performing audio signal processing on audio data to be played based on the number and the position relationships to obtain an audio signal matching the number of the audio playback devices; and playing the audio signal through the audio playback devices.

14 Claims, 5 Drawing Sheets

(56) References Cited

U.S. PATENT DOCUMENTS

2018/0084363 A1   3/2018  Kadri
2020/0267491 A1   8/2020  Daly

FOREIGN PATENT DOCUMENTS

| CN | 108882139 A | 11/2018 |
|---|---|---|
| EP | 3209029 A1 | 8/2017 |
| JP | 2014022959 A | 2/2014 |
| WO | WO 2006131894 A2 | 12/2006 |
| WO | WO 2020030769 A1 | 2/2020 |

OTHER PUBLICATIONS

Chinese Patent Application No. 202011306975.9, English translation of Office Action dated Jul. 5, 2021, 8 pages.
European Patent Application No. 21176073.1, Search and Opinion dated Dec. 16, 2021, 9 pages.
Japanese Patent Application No. 2021-083272, Office Action dated Jul. 5, 2022, 4 pages.
Japanese Patent Application No. 2021-083272, English translation of Office Action dated Jul. 5, 2022, 4 pages.
Indian Patent Application No. 202144022688, Office Action dated May 25, 2022, 7 pages.
Korean Patent Application No. 10-2021-0062689, Office Action dated Mar. 31, 2022, 7 pages.
Korean Patent Application No. 10-2021-0062689, English translation of Office Action dated Mar. 31, 2022, 8 pages.

\* cited by examiner

SYSTEM AND METHOD FOR PLAYING AUDIO DATA ON MULTIPLE DEVICES

CROSS-REFERENCE TO RELATED APPLICATION

This application is based on and claims priority to Chinese Patent Application No. 202011306975.9 filed on Nov. 19, 2020, the content of which is hereby incorporated by reference in its entirety into this disclosure.

TECHNICAL FIELD

The disclosure relates to electronic technology, and more particularly, to a method for playing audio data, an electronic device, and a storage medium.

BACKGROUND

Smart homes are widely used with the development of artificial intelligence and Internet of Things (IoT) technologies. Smart homes may connect various devices such as audio and video equipment, lighting systems, curtains, air conditioners, cleaning appliances, and various household electrical appliances or systems in the home together through IoT technology, to achieve functions such as remote control, timing control, and linking of devices to each other and to control devices such as a mobile phone.

SUMMARY

According to a first aspect of embodiments of the disclosure, a method for playing audio data may be provided. The method may include: detecting a number and position relationships of a plurality of associated audio playback devices; performing audio signal processing on audio data to be played based on the number and the position relationships to obtain an audio signal matching the number of the a plurality of audio playback devices; and playing the audio signal through the audio playback devices.

According to a second aspect of embodiments of the disclosure, an electronic device may be provided. The electronic device may at least include: a processor; and a memory for storing instructions executable by the processor. The processor is configured to execute the instructions to perform actions of any method for playing audio data.

According to a third aspect of embodiments of the disclosure, a non-transitory computer-readable storage medium may be provided. The non-transitory computer-readable storage medium has stored therein computer instructions that, when executed by a processor, perform actions of any method for playing audio data.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
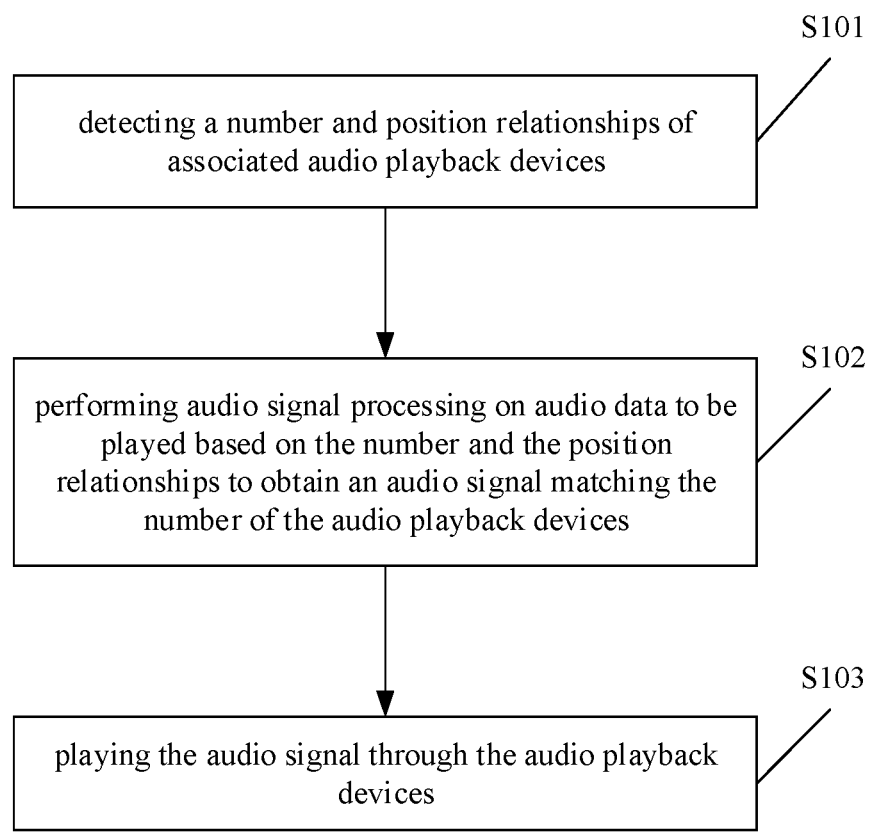
FIG. 1 is a flow chart illustrating a method for playing audio data, according to some embodiments.

FIG. 1 is a flow chart illustrating a method for playing audio data, according to some embodiments. Referring to FIG. 1, the method includes the following.

At block S101, a number and position relationships of a plurality of associated audio playback devices are detected.

At block S102, audio signal processing is performed on audio data to be played based on the number and the position relationships to obtain an audio signal matching the number of the audio playback devices.

At block S103, the audio signal is played through the a plurality of audio playback devices.

In some embodiments of the disclosure, the audio playback device may be any household electrical appliance with an audio playback function. The audio playback device herein may be an electronic device that has video playing, audio collecting, video collecting, and various other functions at the same time, such as a mobile phone, a television, a smart speaker, a smart microphone with the audio playback function, a head-mounted display device, and a computer; and may also be a speaker device with the audio playback function only; and the like. The above-mentioned multiple audio playback devices may include the same type of household electrical appliances, or different types of household electrical appliances, for example, a television and multiple smart speakers, or a television and multiple smart microphones.

In some embodiments of the disclosure, the multiple audio playback devices may be connected to each other or one another in a wired or wireless manner, or may establish a communication connection with the same control device, and the control device may control the multiple audio playback devices to be associated with each other or one another. There is a data transmission function among the multiple audio playback devices, or the multiple audio playback devices may have a data transmission function with the same control device only. For example, an audio playback device such as a speaker may be added with one or more of wireless communication functions such as Bluetooth, Near Field Communication (NFC), Ultra Wideband (UWB), and wireless fidelity (Wi-Fi), so that the audio playback device may realize functions such as communication and data transmission with other audio playback devices, or realize wireless communication or data transmission with other devices equipped with wireless communication functions such as Bluetooth, NFC, UWB, and Wi-Fi. Similarly, another audio playback device such as a television or other playback device may be added with one or more of wireless communication functions such as Bluetooth, NFC, UWB, and Wi-Fi, which may also realize intercommunication among devices with wireless communication functions or intercommunication with a terminal. In another example, the multiple audio playback devices may establish a communication connection with the mobile phone through an application program of the mobile phone, and the multiple audio playback devices may be controlled by the mobile phone to play audios. For another example, one of a plurality of audio playback devices is used to control other audio playback devices of the multiple audio playback devices to play audios.

Therefore, the above-mentioned method of the embodiments of the disclosure may be executed by one of the multiple audio playback devices, or may be executed by other control device.

In some embodiments of the disclosure, the audio signal processing may be performed on the audio data to be played by detecting the number and the position relationship of the multiple associated audio playback devices. For example, the audio data to be played may be processed through up-mixing or down-mixing processing to obtain the audio signal that may match the number of the audio playback devices. The up-mixing may mean that the number of channels obtained by mixing the audio signal to be played is more than the original number of channels, for example, 2.0 channels are upmixed to 4.0 channels; the down-mixing may mean that the number of channels obtained by mixing is less than the original number of channels. For example, 5.1 channels are downmixed to 2.1 channels.

The channels herein may include, but be not limited to, two or more of the following: L (left channel), R (right channel), Ls (left surround channel), Rs (right surround channel), C (middle channel), Ltop (left upper channel or left sky channel), Rtop (right upper channel or right sky channel), Lcs (left center surround channel), and LFE (bass channel).

In some embodiments of the disclosure, the audio signal processing may be performed on the audio data to be played, which may include: extracting channels or combining channels contained in the audio data to be played, or may also include: performing the audio signal processing by extracting different types of sound information in the audio data to be played. For example, the background sound and the human voice are separated into different audio signals. For another example, the audio data to be played may be separated based on sounds with different orientation information.

In this way, the signal processing may be performed on the audio to be processed based on different numbers and position relationships of the audio playback devices, and the matched audio signal may be played through the audio playback devices in different positions. On one hand, various different devices with audio playback functions in the home are effectively used to achieve linked playback. On the other hand, the audio signal processing is used to match the audio playback devices at different positions to obtain better audio playback effects.

In some embodiments, the detecting the number and the position relationships of a plurality of associated audio playback devices may include the following.

The number of a plurality of audio playback devices may be determined through associated information of a plurality of associated audio playback devices.

Audio detection may be performed through a plurality of audio playback devices.

The position relationships may be determined based on a detection result of the audio detection.

A plurality of associated audio playback devices may have associated information indicating that they are associated with each other or one another. For example, if a plurality of audio playback devices have a communication connection with the same device, the identification information, network interface information, and the like of the same device may be used as the above-mentioned associated information. For another example, a plurality of audio playback devices have the same identification information, and the identification information indicates that these audio playback devices are related to each other or one another.

The number of a plurality of associated audio playback devices may be determined through the above-mentioned associated information. For example, a television may have a communication connection with a plurality of speakers, and the television may determine the number of the speakers based on the connection information connected to itself. That is, the number of a plurality of audio playback devices is the sum of the television itself and the number of the speakers. For another example, a mobile phone or an independent control device (such as a remote control device) may have a communication connection with a plurality of audio playback devices such as speakers or televisions, and the mobile phone may determine the number of a plurality of audio playback devices through information such as the identification of the communication connection.

Since a plurality of audio playback devices each has the audio playback function, a plurality of audio playback devices may be used to perform the audio detection, and the number of the audio playback devices may be further determined. For example, a plurality of audio playback devices may play the test audio in sequence, the control device such as the mobile phone may be used to detect the test audio played by each audio playback device, and determine the direction and distance of the audio playback device based on information such as the receiving time and intensity of the test audio. For another example, at least one device with the audio collection function among a plurality of audio playback devices may be used to receive the test audio played by other audio playback devices, and the corresponding relative directions and distances may be determined.

In this way, by performing the audio detection through a plurality of audio playback devices, the position relationships of a plurality of audio playback devices may be determined, thereby facilitating the subsequent distribution of the audio signal for different positions or channels.

In some embodiments, the performing the audio detection through a plurality of audio playback devices may include the following.

A test audio may be played through at least one audio playback device among a plurality of audio playback devices.

The test audio may be collected through at least one audio playback device having an audio collection function among the a plurality of audio playback devices.

The detection result may be determined based on the collected test audio.

In some embodiments of the disclosure, a plurality of audio playback devices may play the test audio in sequence, or play different test audios at the same time. If at least one of a plurality of audio playback devices has the audio collection function, this audio playback device may be used to collect the test audio played by other audio playback devices to determine the aforementioned detection result.

The test audio herein may be a short period of music, voice, or rhythm, or an audio that may not be heard by humans such as ultrasound. The audio test may be performed before the audio data to be played is played, may be performed at intervals of time, may be performed after an associated communication connection among a plurality of audio playback devices is established, or may be performed when the user manually triggers it.

In some embodiments, the number and the position relationships of a plurality of associated audio playback devices may be detected every predetermined time interval, so as to re-process the audio data to be played based on the updated number and position relationships of a plurality of audio playback devices. The audio signal may be played through a plurality of audio playback devices.

In this way, there is no need to fix or specify the positions of a plurality of audio playback devices, so that the user may flexibly place different audio playback devices based on her/his own needs or types of audio playback devices. Regardless of the placement manner, the position relationships of a plurality of audio playback devices may be obtained through detection, and the corresponding processing and playing of the audio data to be played may be performed.

In some embodiments, the determining the position relationships based on the detection result of the audio detection may include the following.

A relative position of the audio playback device that plays the test audio with respect to the audio playback device that collects the test audio may be determined based on the collected test audio.

The position relationships of a plurality of audio playback devices may be determined based on the relative position of each audio playback device that plays the test audio.

In some embodiments, the device for collecting the test audio may be a microphone array with a positioning function. The direction and distance of the sound source may be determined based on information such as the time differences among the test audios collected by microphone channels of different orientations in the microphone array.

In some embodiments, at least two audio playback devices with audio collection functions in different positions may be used to collect the test audio. For example, device A plays the test audio, device B and device C collect the test audio separately. The relative position relationships among device A, device B, and device C may be determined based on the signal difference such as the intensity, time difference between the test audios collected by device B and device C.

In this way, by analyzing and processing the collected test audios among a plurality of audio playback devices, the position relationships of the above audio playback devices may be obtained. A plurality of audio playback devices do not need to have functions such as positioning themselves.

In this way, the user may place a plurality of audio playback devices based on her/his own habits, which is convenient for operation.

In some embodiments, the determining the position relationships of a plurality of audio playback devices based on the relative position of each audio playback device that plays the test audio may include the following.

It is determined that a position relationship belongs to a first position relationship in response that an angle between a direction of the audio playback device that plays the test audio with respect to the audio playback device that collects the test audio and a predetermined direction is less than a predetermined angle.

It is determined that the position relationship belongs to a second position relationship in response that an angle between the direction of the audio playback device that plays the test audio with respect to the audio playback device that collects the test audio and the predetermined direction is greater than or equal to the predetermined angle.

In some embodiments, under a case that the number of the audio playback devices is two, if the angle between the predetermined direction determined based on the audio playback device that plays the test audio and the audio playback device that collects the test audio is less than the preset angle, it may be determined as the first position relationship, and when the angle is greater than or equal to the preset angle, it may be determined as the second position relationship.

Figure 2:
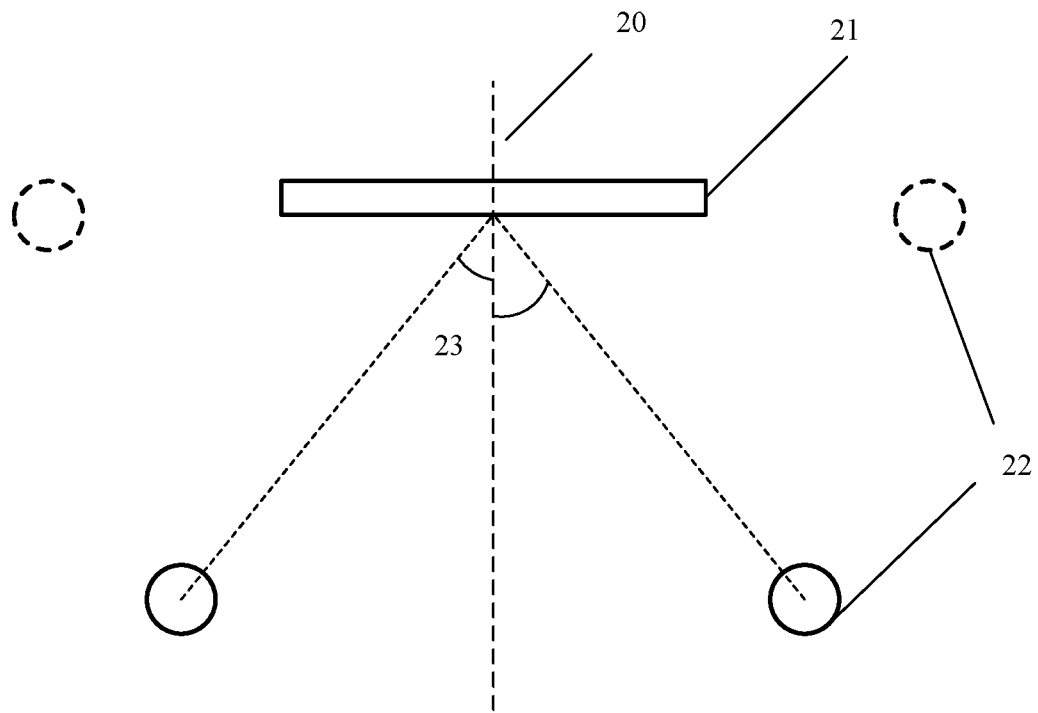
FIG. 2 is a first schematic diagram illustrating a principle of determining position relationships, according to some embodiments.

As illustrated in FIG. 2, the microphone array in the audio playback device 21 (such as a television) may be used to receive the test audio played by other audio playback device 22. If the angle between the direction of the test audio played by the tested audio playback device 22 and the central axis 20 (or other predetermined direction) of the audio playback device 21 is less than the preset angle, a plurality of audio playback devices may have a surround effect. Therefore, it may be determined as the first position relationship and the surround sound effect may be played. If the angle between the direction of the test audio played by the tested audio playback device 22 and the central axis 20 (or other predetermined direction) of the audio playback device 21 is greater than or equal to the preset angle, there may be no a surround position among a plurality of audio playback devices. Therefore, the surround sound effect may not satisfy the placement position of the audio playback devices. Thus, it may be determined as the second position relationship, and the stereo sound effect is played correspondingly.

In some embodiments, under a case that the number of the audio playback devices is greater than two, the audio playback device that plays the test audio is taken as the apex. If the angle formed by this audio playback device with other audio playback device that collect the test audio is less than the preset angle, it may be determined as the first position relationship; and when the angle is greater than or equal to the preset angle, it may be determined as the second position relationship.

Figure 3:
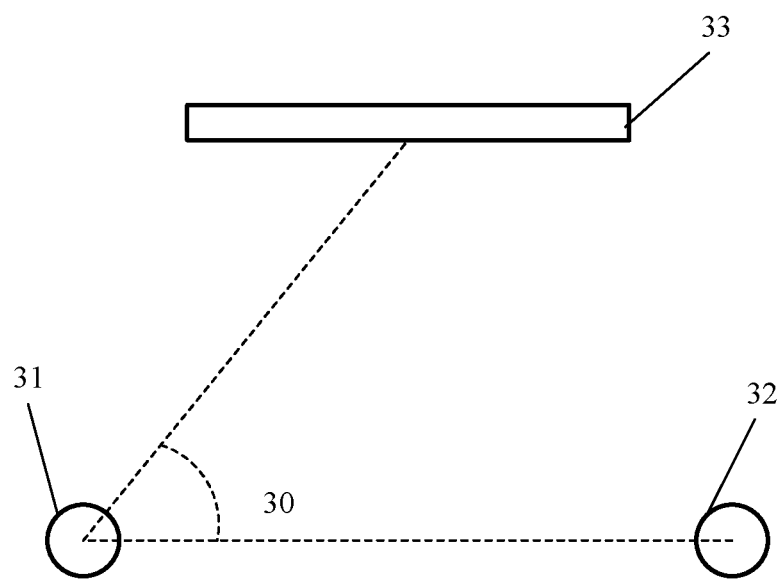
FIG. 3 is a second schematic diagram illustrating a principle of determining position relationships, according to some embodiments.

As illustrated in FIG. 3, the microphone array in one audio playback device 31 (such as a speaker) may be used to receive the test audios each played by the corresponding other audio playback device, including another speaker 32 or television 33, and determine the directional relationships and distances among itself and other audio playback devices. If the included angle 30 among the three (which may be any three of a plurality of audio playback devices) is less than the preset angle, it may not have a surround position, and the placement requirements for the surround sound effect may not be satisfied, so it may be determined as the first position relationship, and the corresponding stereo sound effect may be played. If the included angle 30 among the three is greater than or equal to the preset angle, the placement requirements of the surround sound effect may be satisfied, so it may be determined as the second position relationship, and the surround sound effect is played correspondingly. It should be noted that the preset angle is associated with the number of the audio playback devices. When the number of the audio playback devices is different, the value of the preset angle corresponding for determining the first position relationship or the second position relationship may also change. The specific value of this parameter may be set as required, which is not limited in the disclosure.

In some embodiments, the performing the audio signal processing on the audio data to be played based on the number and the position relationships to obtain the audio signal matching the number of the audio playback devices may include the following.

Audio signal processing may be performed on the audio data to be played to obtain a first-type audio signal in response to a position relationship of at least two of the audio playback devices satisfying a first position relationship, in which a number of channels of the first-type audio signal matches a number of audio playback devices that satisfy the first position relationship.

And/or, audio signal processing may be performed on the audio data to be played to obtain a second-type audio signal in response to a position relationship of at least two of the audio playback devices satisfying a second position relationship, in which a number of channels of the second-type audio signal matches a number of audio playback devices that satisfy the second position relationship. In the embodiments of the disclosure, the audio signal processing may be performed on the audio data to be played based on the position relationships of a plurality of audio playback devices. The audio signal processing herein may include one or more different manners, such as using a decoder to decode to generate a surround sound signal, using channel mixing to obtain a stereo signal, and the like.

Different audio signals may be generated correspondingly based on the different position relationships of the audio playback devices. If the position relationships among a plurality of audio playback devices satisfy a variety of different conditions, a plurality of different types of audio signals may also be generated and distributed at the same time to the corresponding audio playback devices to play.

In this way, the audio data to be played may be flexibly processed based on various requirements, so that the audio effect that is compatible with the position relationships of a plurality of audio playback devices may be obtained through playing.

In some embodiments, the performing the audio signal processing on the audio data to be played to obtain the first-type audio signal may include the following.

At least one group of signal features of a predetermined type may be extracted from the audio data to be played.

The first-type audio signals of the number of audio playback devices that satisfy the first position relationship may be generated based on the least one group of signal features.

The signal features herein may be frequency, amplitude, and frequency spectrum of the audio data to be played, or features with position information. By extracting the features, a plurality of sets of different audio signals may be generated and played through different audio playback devices.

In some embodiments, the first-type audio signal may include a surround sound signal; and the signal features of the predetermined type may include features of the surround sound signal.

In some embodiments of the disclosure, different types of processing may be performed on the audio data to be played based on different position relationships of audio playback devices. The surround sound herein refers to decoding through a decoder to play the sound at different positions of the audio playback devices at different moments. Therefore, the processing of the audio data to be played may be, decoding the audio data to be played, to generate the surround sound signal for the audio playback devices corresponding to different positions. The surround sound signal at different positions may contain the same playback content or different playback content. In addition, the surround sound signal at different positions may include the same or different strength, volume, tone, frequency, and the like.

In the process of generating the surround sound signal, since the surround sound signal played by audio playback devices at different positions may have time differences, the surround sound signal may be decorrelated herein to obtain the audio signals corresponding to the audio playback devices at different positions.

In some embodiments, the performing the audio signal processing on the audio data to be played to obtain the second-type audio signal may include the following.

Channel mixing may be performed on the audio data to be played to obtain the second-type audio signals of the number of audio playback devices that satisfy the second position relationship.

In some embodiments of the disclosure, channels matching the corresponding number may also be obtained by way of audio channel mixing. The audio data to be played may contain one or more channels itself. By up-mixing at least one channel, the number of channels may be increased; by down-mixing a plurality of channels, the number of channels may be reduced. Thus, a channel signal matching the number of audio playback devices may be obtained.

In some embodiments, the second-type audio signal may include a stereo signal. The performing the channel mixing on the audio data to be played to obtain the second-type audio signals of the number of audio playback devices that satisfy the second position relationship may include: performing the channel mixing on the audio data to be played based on a number of channels of the audio data to be played to obtain a stereo signal of the number of audio playback devices that satisfy the second position relationship.

Stereo is to simulate the binaural effect through different channels, and may maintain the spatial distribution characteristics such as the azimuth and level of sound when it is played through speakers in different positions. By obtaining channel information in the audio data to be played, the audio signal that may be played by audio playback devices at different positions may be obtained, thereby achieving the stereo effect.

The embodiments of the disclosure also provide the following examples.

With the increasing maturity of artificial intelligence and Internet of Things technologies, the demand for audio-visual entertainment electronic products such as smart televisions and smart speakers has become more prominent. In order to create an immersive listening experience, the audio-visual electronic products need surround sound sources on the term of audio sources, and specific surround sound equipment may be required on the term of equipment requirements. The surround sound equipment refers to a multi-channel surround sound system, such as a 5.1 surround sound system and a 7.1 surround sound system. Generally, one system is very expensive. The surround sound sources refer to sound sources that contain multi-channel information. At present, most mainstream sources are stereo, and the proportion of 5.1 and above sources is very rare. Generally, it needs to be up-mixed to obtain a surround sound path.

In some embodiments of the disclosure, by employing the possible device linkage of a home user, the home surround sound or stereo system may be formed by combining one television and a plurality of (or one) smart speakers or by combining a plurality of smart speakers. Multi-format film sources may be performed with different up-mixing algorithms through its own wireless protocol to obtain the audio of the target device, so as to obtain better quality and comprehensive sound, wider sound field, and satisfy all audio surround sound and stereo listening experience.

In some embodiments, a method for up-mixing an audio signal may include: decomposing the audio signal into a diffusion signal and a direct signal; generating an audio static environmental sound based at least in part on the diffusion signal, in which the audio static environmental sound includes a height channel; extracting an audio object from the direct signal; estimating a metadata of the audio object, in which the metadata includes height information of the audio object; rendering the audio static environmental sound and the audio object as an up-mixed audio signal, in which the audio static environmental sound is rendered to a predefined position and the audio object is rendered based on the metadata. The up-mixing system includes: a direct/diffusion signal decomposer; a static environmental sound generator; an object extractor; a metadata estimator; and an audio renderer. However, this method relies on a complete surround sound device, and the hardware cost is high.

In some embodiments, the effect of stereo surround sound is realized through a smart television. The method may include: after the smart television obtains an original audio signal, separating a sub-audio signal contained in the original audio signal into two parts if it is determined that the original audio signal supports the surround sound effect; sending a first part of the sub-audio signal to the speaker inside the housing of the smart television to play; and sending a second part of the sub-audio signal to the mobile Bluetooth speaker wirelessly connected to the smart television to play. In this way, the surround sound effect is realized at the lowest cost, and the Bluetooth speaker is convenient to move. The layout is simple, so it is suitable for widespread promotion, which effectively improves the product competitiveness and user experience.

In some embodiments of the disclosure, a solution for playing surround sound/stereo sound in combination with a smart television and a smart speaker is provided.

On one hand, embodiments of the disclosure provide a solution for up-mixing a plurality of types of audio signals. The method includes: processing the audio data to be played through an algorithm to extract a surround sound signal; performing decorrelation processing on the surround sound signal; and rendering the original audio signal and the surround sound signal after the decorrelation processing as an up-mixed audio signal. On the other hand, embodiments of the disclosure provide a solution for down-mixing or up-mixing a plurality of audio signals and the number of target speakers. The current up-mixing solution supports different numbers of speakers. When there are 2 speakers, channels may include FL (left channel), FR (right channel), Ls (left surround channel), Rs (right surround channel), C (middle channel), Ltop (left upper channel or left sky channel), Rtop (right upper channel or right sky channel), and LFE (bass channel), where Ls and Rs are speaker channels; when there are 4 speakers, channels may include FL (left channel), FR (right channel), Lside (left side channel), Rside (right side channel), Ls (left surround channel), Rs (right surround channel), C (middle channel), Ltop (left upper channel or left sky channel), Rtop (right upper channel or right sky channel), and LFE (bass channel), where Ls, Rs, (Lside, Rside) or (Ltop, Rtop) are speaker channels. The above is upmixed or downmixed to channel information of 2 or 4 surround sound channels or stereo sound channels of speakers to obtain surround sound and stereo information respectively. When there are a plurality of speakers, more channel transformations and choices may be employed.

The up-mixing means that the number of signal channels after up-mixing is greater than the number of original signal channels, such as 2.0 is up-mixed to 4.0; the down-mixing means that the number of signal channels after down-mixing is less than the number of original signal channels, such as 5.1 is down-mixed to 2.1 channels.

On the device, some embodiments of the disclosure provide a method for playing by combining a smart television and a smart speaker. The method includes different combinations of televisions and speakers, and completes device linkage through a private wireless transmission protocol (Wi-Fi or Bluetooth), to achieve the effect of a plurality of channels being played together.

Some embodiments of the disclosure also provide a system for combining a smart television and a smart speaker to play surround sound. The system includes: a surround sound extractor, which is configured to extract a surround sound signals from the original audio signal; a decorrelator, which is configured to decorrelate the surround sound signal; an audio renderer (the smart television and the smart speaker); and the wireless linkage between the television and the speaker.

The switch between stereo sound and surround sound may be automatically performed based on preferences of the user. The system may also automatically detect the relative position of the speaker and the television to confirm the relative position, and automatically switch to the case suitable for playing surround sound or the case suitable for playing stereo sound.

In the process of automatic networking, the television-speaker surround-stereo system may also automatically complete the channel detection and the channel configuration without the user's manual completion.

The surround-stereo mode and the channel detection may be as follows (the television has a microphone array): sending by the speaker a test signal (the test audio may be an ultrasonic wave, a piece of beautiful music, or a piece of perceptual voice, frequency sweeping, etc.), and turning on by the television a recording function, and using the microphone array by the television to locate the position of the speaker relative to the television based on a sound source positioning principle. In the same way, the positions of other speakers may be tested. The user is prompted to place the speakers based on the symmetry of the upper and lower center axis of the television. The system may automatically complete the allocation of left and right channels based on the position information. position, and may automatically complete the switch between the surround sound and the stereo sound.

As illustrated in FIG. 2, it is detected that the positions denoted by solid lines may be a surround sound mode, and the positions denoted by dotted lines may be a stereo sound mode. There is an angle threshold between the two modes.

As illustrated in FIG. 3, there is another solution for detecting a surround sound mode or a stereo sound mode (the speaker has a microphone array). One speaker is used to receive, and the television and another speaker are used to send sound. The three forms an acute angle. If the acute angle is less than a certain value, it is in the stereo sound mode, and if the acute angle is greater than the certain value, it is in the surround sound mode. If it is in the surround sound mode, and the television is on the left of the acute angle, the receiving speaker is on the left; otherwise, the receiving speaker is on the right. Therefore, left and right channels may be determined. However, in this way, the stereo sound mode may not distinguish left and right channels, so manual determining for left and right channels is required. This solution is suitable for the case where the television does not have a microphone array.

Figure 4:
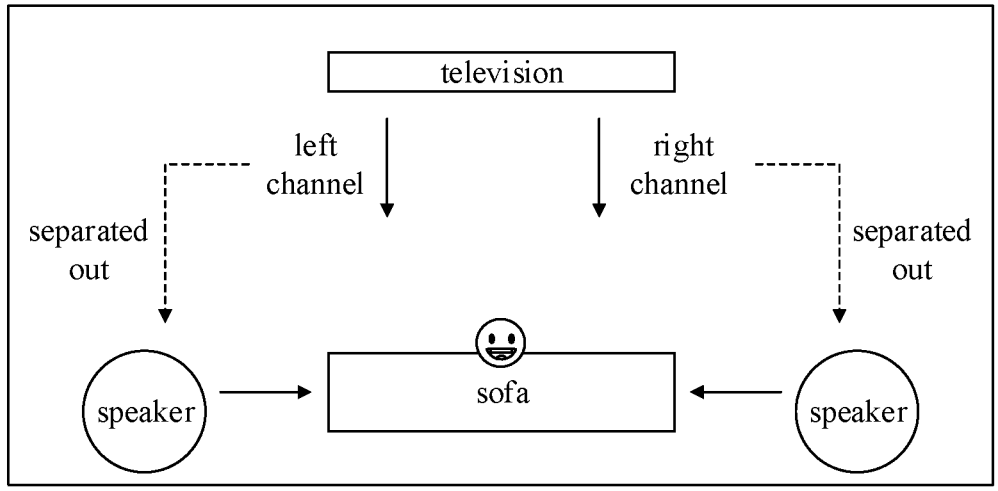
FIG. 4 is a schematic diagram illustrating position relationships of audio playback devices with a surround sound effect, according to some embodiments.
Figure 5:
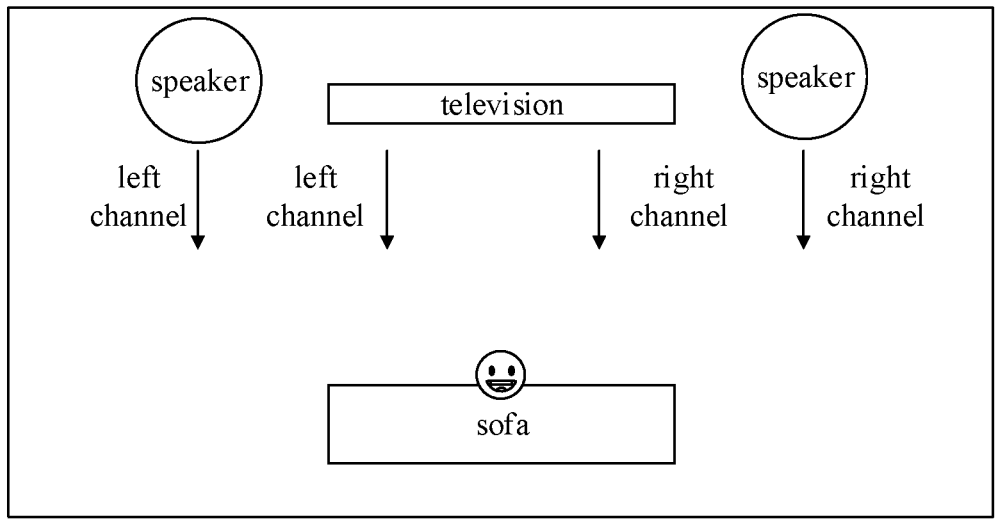
FIG. 5 is a schematic diagram illustrating position relationships of audio playback devices with a stereo effect, according to some embodiments.

Illustratively, take a common 2.0-channel audio source to be played as an example. As illustrated in FIG. 4, the surround sounds may be separated from the audio data to be played and played through independent speakers. The television may play the original left and right channels. Therefore, the surround sound effect may be achieved. As illustrated in FIG. 5, the left and right channels of the audio data to be played are played through independent speakers, and the original left and right channels are played by the television to achieve a stereo sound effect.

Figure 6:
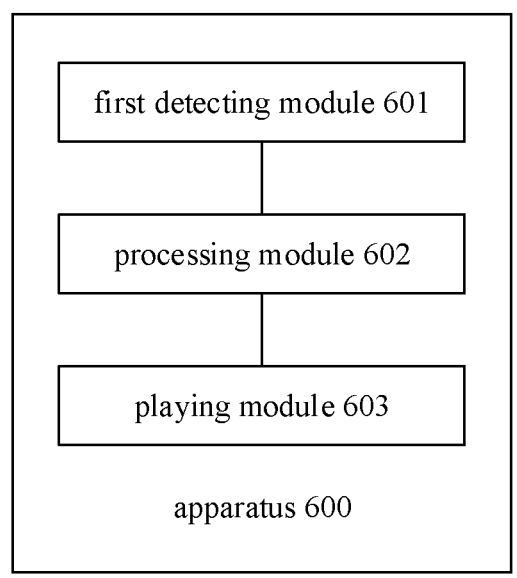
FIG. 6 is a block diagram illustrating an apparatus for playing audio data, according to some embodiments.

FIG. 6 is a block diagram illustrating an apparatus for playing audio data, according to some embodiments. Referring to FIG. 6, the apparatus 600 may include a first detecting module 601, a processing module 602, and a playing module 603.

The first detecting module 601 is configured to detect a number and position relationships of a plurality of associated audio playback devices, in which the audio playback device may include a household electrical appliance with an audio playback function.

The processing module 602 is configured to perform audio signal processing on audio data to be played based on the number and the position relationships to obtain an audio signal matching the number of the audio playback devices.

The playing module 603 is configured to play the audio signal through a plurality of audio playback devices.

In some embodiments, the first detecting module may include: a first determining sub module, a detecting sub module, and a second determining sub module.

The first determining sub module is configured to determine the number of a plurality of audio playback devices through associated information of a plurality of associated audio playback devices.

The detecting sub module is configured to perform audio detection through a plurality of audio playback devices.

The second determining sub module is configured to determine the position relationships based on a detection result of the audio detection.

In some embodiments, the detecting sub module may include: a playing sub module, a collecting sub module, and a third determining sub module.

The playing sub module is configured to play a test audio through at least one audio playback device among a plurality of audio playback devices.

The collecting sub module is configured to collect the test audio through at least one audio playback device having an audio collection function among a plurality of audio playback devices.

The third determining sub module is configured to determine the detection result based on the collected test audio.

In some embodiments, the second determining sub module may include a fourth determining sub module and a fifth determining sub module.

The fourth determining sub module is configured to determine a relative position of the audio playback device that plays the test audio with respect to the audio playback device that collects the test audio based on the collected test audio.

The fifth determining sub module is configured to determine the position relationships of a plurality of audio playback devices based on the relative position of each audio playback device that plays the test audio.

In some embodiments, the determining the position relationships of a plurality of audio playback devices based on the relative position of each audio playback device that plays the test audio may include: a sixth determining sub module, configured to determine that a position relationship belongs to a first position relationship in response that an angle between a direction of the audio playback device that plays the test audio with respect to the audio playback device that collects the test audio and a predetermined direction is less than a predetermined angle; and a seventh determining sub module, configured to determine that the position relationship belongs to a second position relationship in response that an angle between the direction of the audio playback device that plays the test audio with respect to the audio playback device that collects the test audio and the predetermined direction is greater than or equal to the predetermined angle.

In some embodiments, the processing module may include a first processing sub module and/or a second processing sub module.

The first processing sub module is configured to perform audio signal processing on the audio data to be played to obtain a first-type audio signal in response to a position relationship of at least two of the audio playback devices satisfying a first position relationship, in which a number of channels of the first-type audio signal matches a number of audio playback devices that satisfy the first position relationship.

The second processing sub module is configured to perform audio signal processing on the audio data to be played to obtain a second-type audio signal in response to a position relationship of at least two of the audio playback devices satisfying a second position relationship, in which a number of channels of the second-type audio signal matches a number of audio playback devices that satisfy the second position relationship.

In some embodiments, the first processing sub module may include an extracting sub module and a generating sub module.

The extracting sub module is configured to extract at least one group of signal features of a predetermined type from the audio data to be played.

The generating sub module is configured to generate the first-type audio signals of the number of audio playback devices that satisfy the first position relationship based on the least one group of signal features.

In some embodiments, the first-type audio signal may include a surround sound signal; and the signal features of the predetermined type may include features of the surround sound signal.

In some embodiments, the first processing sub module may include a mixing sub module.

The mixing sub module is configured to perform channel mixing on the audio data to be played to obtain the second-type audio signals of the number of audio playback devices that satisfy the second position relationship.

In some embodiments, the second-type audio signal may include a stereo signal. The mixing sub module is further configured to perform the channel mixing on the audio data to be played based on a number of channels of the audio data to be played to obtain a stereo signal of the number of audio playback devices that satisfy the second position relationship.

With respect to the apparatuses in the above embodiments, the specific manners for performing operations for individual modules therein have been described in detail in the embodiments regarding the methods, which will not be elaborated herein.

Figure 7:
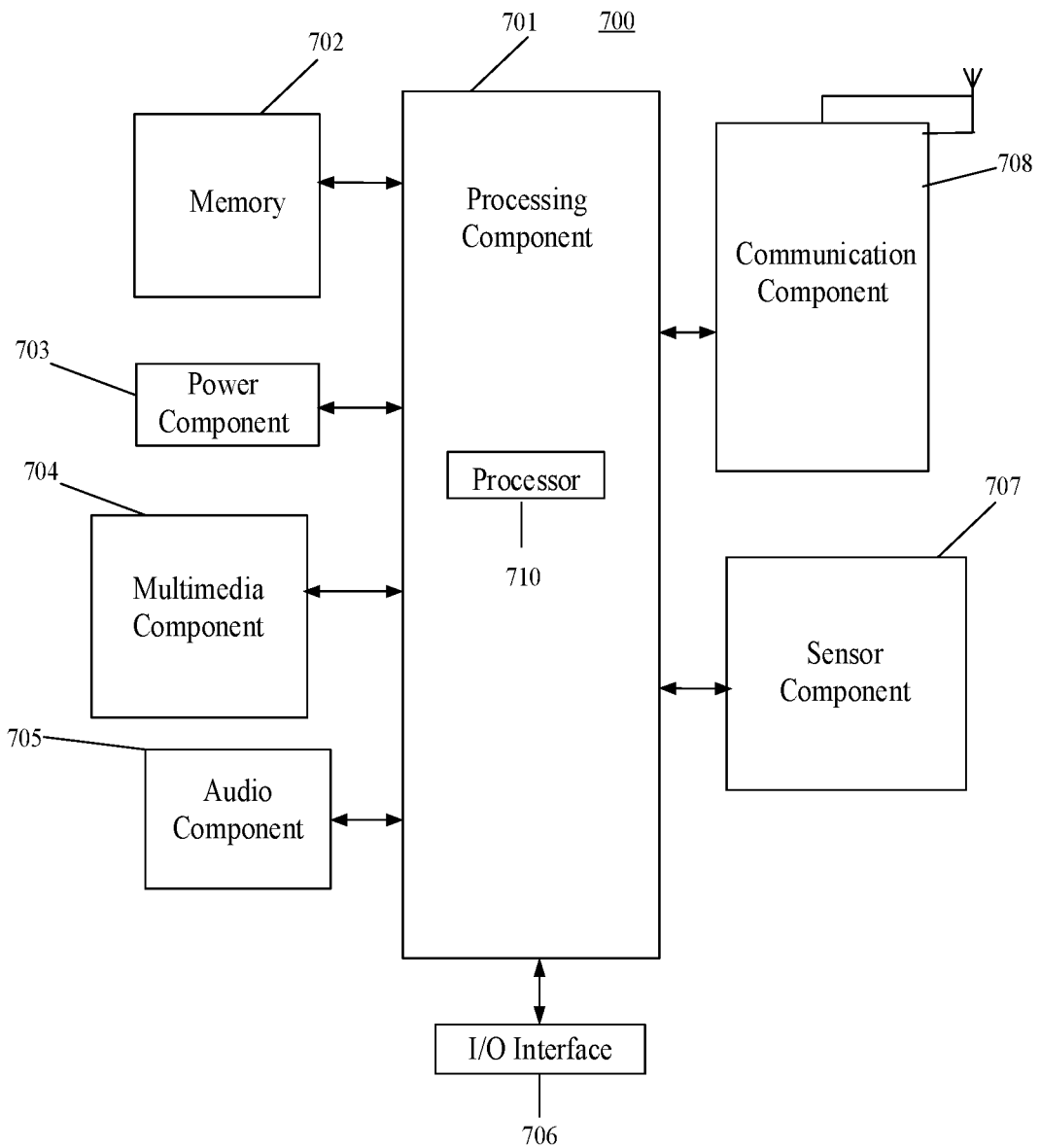
FIG. 7 is a block diagram illustrating an electronic device, according to some embodiments.

FIG. 7 is a block diagram of an electronic device 700, according to some embodiments. For example, the electronic device 700 may be a mobile phone, a computer, a digital broadcast terminal, a messaging device, a gaming console, a tablet, a medical device, exercise equipment, a personal digital assistant, and the like.

Referring to FIG. 7, the electronic device 700 may include one or more of the following components: a processing component 701, a memory 702, a power component 703, a multimedia component 704, an audio component 705, an input/output (I/O) interface 706, a sensor component 707, and a communication component 708.

The processing component 701 typically controls overall operations of the electronic device 700, such as the operations associated with display, telephone calls, data communications, camera operations, and recording operations. The processing component 701 may include one or more processors 710 to execute instructions to perform all or part of the steps in the above described methods. Moreover, the processing component 701 may include one or more modules which facilitate the interaction between the processing component 701 and other components. For instance, the processing component 701 may include a multimedia module to facilitate the interaction between the multimedia component 704 and the processing component 701.

The memory 702 is configured to store various types of data to support the operation of the electronic device 700. Examples of such data include instructions for any applications or methods operated on the electronic device 700, contact data, phonebook data, messages, pictures, video, etc. The memory 702 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 703 provides power to various components of the electronic device 700. The power component 703 may include a power management system, one or more power sources, and any other components associated with the generation, management, and distribution of power in the electronic device 700.

The multimedia component 704 includes a screen providing an output interface between the electronic device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 704 includes a front camera and/or a rear camera. The front camera and the rear camera may receive an external multimedia datum while the electronic device 700 is in an operation mode, such as a photographing mode or a video mode. Each of the front camera and the rear camera may be a fixed optical lens system or have focus and optical zoom capability.

The audio component 705 is configured to output and/or input audio signals. For example, the audio component 705 includes a microphone ("MIC") configured to receive an external audio signal when the electronic device 700 is in an operation mode, such as a call mode, a recording mode, and a voice recognition mode. The received audio signal may be further stored in the memory 702 or transmitted via the communication component 708. In some embodiments, the audio component 705 further includes a speaker to output audio signals.

The I/O interface 706 provides an interface between the processing component 701 and peripheral interface modules, such as a keyboard, a click wheel, buttons, and the like. The buttons may include, but are not limited to, a home button, a volume button, a starting button, and a locking button.

The sensor component 707 includes one or more sensors to provide status assessments of various aspects of the electronic device 700. For instance, the sensor component 707 may detect an open/closed status of the electronic device 700, relative positioning of components, e.g., the display and the keypad, of the electronic device 700, a change in position of the electronic device 700 or a component of the electronic device 700, a presence or absence of user contact with the electronic device 700, an orientation or an acceleration/deceleration of the electronic device 700, and a change in temperature of the electronic device 700. The sensor component 707 may include a proximity sensor configured to detect the presence of nearby objects without any physical contact. The sensor component 707 may also include a light sensor, such as a CMOS or CCD image sensor, for use in imaging applications. In some embodiments, the sensor component 707 may also include an accelerometer sensor, a gyroscope sensor, a magnetic sensor, a pressure sensor, or a temperature sensor.

The communication component 708 is configured to facilitate communication, wired or wirelessly, between the electronic device 700 and other devices. The electronic device 700 can access a wireless network based on a communication standard, such as WiFi, 2G, or 3G, or a combination thereof. In one exemplary embodiment, the communication component 708 receives a broadcast signal or broadcast associated information from an external broadcast management system via a broadcast channel. In one exemplary embodiment, the communication component 708 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the electronic device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 702, executable by the processor 710 in the device electronic device 700, for performing the above-described methods. For example, the non-transitory computer-readable storage medium may be a ROM, a RAM, a CD-ROM, a magnetic tape, a floppy disc, an optical data storage device, and the like.

Some embodiments of the disclosure also provide a non-transitory computer-readable storage medium. The non-transitory computer-readable storage medium has stored therein computer instructions that, when executed by a processor, perform actions of the method provided in any above embodiment.

Other embodiments of the invention will be apparent to those skilled in the art from consideration of the specification and practice of the invention disclosed here. This application is intended to cover any variations, uses, or adaptations of the invention following the general principles thereof and including such departures from the disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

The invention claimed is:

1. A method for playing audio data, comprising:
    detecting a number and position relationships of associated audio playback devices;
    performing audio signal processing on audio data to be played to obtain an audio signal matching the number and the position relationships of the audio playback devices; and
    playing the audio signal through the audio playback devices;
    wherein detecting the number and the position relationships of the associated audio playback devices comprises:
    playing a test audio by a first audio playback device among the audio playback devices;
    collecting the test audio by a second audio playback device with an audio collection function among the audio playback devices;
    determining a direction of the first audio playback device with respect to the second audio playback device based on the collected test audio;
    in response to an angle between the direction and a predetermined direction being less than a predetermined angle, determining that a position relationship between the first and second audio playback devices satisfies a surround sound mode; and
    in response to the angle between the direction and the predetermined direction being greater than or equal to the predetermined angle, determining that a position relationship between the first and second audio playback devices satisfies a stereo sound mode.

2. The method as claimed in claim 1, wherein detecting the number of the associated audio playback devices comprises:
    determining the number of the associated audio playback devices through associated information of the associated audio playback devices.

3. The method as claimed in claim 1, wherein performing the audio signal processing on the audio data to be played to obtain the audio signal matching the number and the position relationships of the audio playback devices comprises:
    performing audio signal processing on the audio data to be played to obtain a first-type audio signal in response to a position relationship of at least two of the audio playback devices satisfying the surround sound mode, in which a number of channels of the first-type audio signal matches a number of audio playback devices that satisfy the surround sound mode; and/or,
    performing audio signal processing on the audio data to be played to obtain a second-type audio signal in response to a position relationship of at least two of the audio playback devices satisfying the stereo sound mode, in which a number of channels of the second-type audio signal matches a number of audio playback devices that satisfy the stereo sound mode.

4. The method as claimed in claim 3, wherein performing the audio signal processing on the audio data to be played to obtain the first-type audio signal comprises:
    extracting at least one group of signal features of a predetermined type from the audio data to be played; and
    generating the first-type audio signals of the number of audio playback devices that satisfy the surround sound mode based on the least one group of signal features.

5. The method as claimed in claim 4, wherein the first-type audio signal comprises a surround sound signal; and the signal features of the predetermined type comprise features of the surround sound signal.

6. The method as claimed in claim 3, wherein performing the audio signal processing on the audio data to be played to obtain the second-type audio signal comprises:
    performing channel mixing on the audio data to be played to obtain the second-type audio signals of the number of audio playback devices that satisfy the second position relationship.

7. The method as claimed in claim 6, wherein the second-type audio signal comprises a stereo signal;
    wherein the performing the channel mixing on the audio data to be played to obtain the second-type audio signals of the number of audio playback devices that satisfy the second position relationship comprises:
    performing the channel mixing on the audio data to be played based on a number of channels of the audio data to be played to obtain a stereo signal of the number of audio playback devices that satisfy the stereo sound mode.

8. An electronic device, comprising:
    a processor; and
    a memory for storing instructions executable by the processor;
    wherein the processor is configured to execute the instructions to:
    detect a number and position relationships of associated audio playback devices;
    perform audio signal processing on audio data to be played to obtain an audio signal matching the number and the position relationships of the audio playback devices; and play the audio signal through the audio playback devices;
wherein the processor is configured to execute the instructions to detect the number and the position relationships of the associated audio playback devices by actions of:
playing a test audio by a first audio playback device among the audio playback devices;
collecting the test audio by a second audio playback device with an audio collection function among the audio playback devices;
determining a direction of the first audio playback device with respect to the second audio playback device based on the collected test audio;
in response to an angle between the direction and a predetermined direction being less than a predetermined angle, determining that a position relationship between the first and second audio playback devices satisfies a surround sound mode; and
in response to the angle between the direction and the predetermined direction being greater than or equal to the predetermined angle, determining that a position relationship between the first and second audio playback devices satisfies a stereo sound mode.

9. The device as claimed in claim 8, wherein the processor is configured to execute the instructions to detect the number of the associated audio playback devices by actions of:
determining the number of the associated audio playback devices through associated information of the associated audio playback devices.

10. The device as claimed in claim 8, wherein the processor is configured to execute the instructions to perform the audio signal processing on the audio data to be played to obtain the audio signal matching the number and the position relationships of the audio playback devices by actions of:
performing audio signal processing on the audio data to be played to obtain a first-type audio signal in response to a position relationship of at least two of the audio playback devices satisfying the surround sound mode, in which a number of channels of the first-type audio signal matches a number of audio playback devices that satisfy the surround sound mode; and/or,
performing audio signal processing on the audio data to be played to obtain a second-type audio signal in response to a position relationship of at least two of the audio playback devices satisfying the stereo sound mode, in which a number of channels of the second-type audio signal matches a number of audio playback devices that satisfy the stereo sound mode.

11. The device as claimed in claim 10, wherein the processor is configured to execute the instructions to perform the audio signal processing on the audio data to be played to obtain the first-type audio signal by actions of:
extracting at least one group of signal features of a predetermined type from the audio data to be played; and
generating the first-type audio signals of the number of audio playback devices that satisfy the surround sound mode based on the least one group of signal features.

12. The device as claimed in claim 10, wherein the processor is configured to execute the instructions to perform the audio signal processing on the audio data to be played to obtain the second-type audio signal by actions of:
performing channel mixing on the audio data to be played to obtain the second-type audio signals of the number of audio playback devices that satisfy the second position relationship.

13. The device as claimed in claim 12, wherein the second-type audio signal comprises a stereo signal; and the processor is configured to execute the instructions to perform the channel mixing on the audio data to be played to obtain the second-type audio signals of the number of audio playback devices that satisfy the second position relationship by actions of:
performing the channel mixing on the audio data to be played based on a number of channels of the audio data to be played to obtain a stereo signal of the number of audio playback devices that satisfy the second position relationship.

14. A non-transitory computer-readable storage medium having stored therein computer instructions that, when executed by a processor, perform actions of a method for playing audio data, the method comprising:
detecting a number and position relationships of multiple associated audio playback devices;
performing audio signal processing on audio data to be played to obtain an audio signal matching the number and the position relationships of the audio playback devices; and
playing the audio signal through the audio playback devices;
wherein detecting the number and the position relationships of the associated audio playback devices comprises:
playing a test audio by a first audio playback device among the audio playback devices;
collecting the test audio by a second audio playback device with an audio collection function among the audio playback devices;
determining a direction of the first audio playback device with respect to the second audio playback device based on the collected test audio;
in response to an angle between the direction and a predetermined direction being less than a predetermined angle, determining that a position relationship between the first and second audio playback devices satisfies a surround sound mode; and
in response to the angle between the direction and the predetermined direction being greater than or equal to the predetermined angle, determining that a position relationship between the first and second audio playback devices satisfies a stereo sound mode.

* * * * *